US008625222B2

(12) United States Patent
Grundvig (10) Patent No.: US 8,625,222 B2
(45) Date of Patent: Jan. 7, 2014

(54) STORAGE DEVICE HAVING CALIBRATION CIRCUITRY PROVIDING PROGRAMMABLE PHASE UPDATE VALUES

(75) Inventor: Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 51 days.

(21) Appl. No.: 13/365,635

(22) Filed: Feb. 3, 2012

(65) Prior Publication Data
US 2013/0201576 A1    Aug. 8, 2013

(51) Int. Cl.
*G11B 5/09*    (2006.01)
(52) U.S. Cl.
USPC .......................... 360/51; 360/42; 369/47.53
(58) Field of Classification Search
USPC .................. 360/51, 31, 42, 69, 75, 70, 73.02, 360/77.08; 369/47.51, 47.52, 47.53, 116
See application file for complete search history.

(56) References Cited

U.S. PATENT DOCUMENTS

| 5,550,685 | A  | * | 8/1996 | Drouin ...................... 360/77.08 |
| 6,943,978 | B1 |   | 9/2005 | Lee |
| 7,675,703 | B2 |   | 3/2010 | Albrecht et al. |
| 7,872,825 | B2 |   | 1/2011 | Sanghvi |
| 7,911,724 | B2 |   | 3/2011 | Buch et al. |
| 8,049,982 | B1 |   | 11/2011 | Grundvig et al. |
| 8,289,643 | B2 | * | 10/2012 | Grundvig et al. ............... 360/51 |
| 2005/0135212 | A1 | * | 6/2005 | Adachi ...................... 369/47.53 |
| 2011/0058274 | A1 |   | 3/2011 | Nishida et al. |
| 2012/0123726 | A1 | * | 5/2012 | Sakai ............................ 702/117 |

* cited by examiner

*Primary Examiner* — Nabil Hindi
(74) *Attorney, Agent, or Firm* — Ryan, Mason & Lewis, LLP (57) ABSTRACT

A hard disk drive or other disk-based storage device comprises a storage disk, a read/write head configured to read data from and write data to the disk, and control circuitry coupled to the read/write head and configured to process data received from and supplied to the read/write head. The control circuitry comprises calibration circuitry configured to vary a phase of a clock signal as a test pattern is written to the storage disk as part of a calibration procedure, and disk locked clock circuitry coupled to the calibration circuitry and configured to obtain phase lock between the clock signal and a timing pattern on a surface of the storage disk. The calibration circuitry is further configured to determine an initial phase update value to be applied by the disk locked clock circuitry in a control loop as the phase of the clock signal is varied as part of the calibration procedure.

21 Claims, 5 Drawing Sheets

STORAGE DEVICE HAVING CALIBRATION CIRCUITRY PROVIDING PROGRAMMABLE PHASE UPDATE VALUES

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions in order to fit more tracks onto each storage disk, such that inter-track interference (ITI) becomes an important performance issue.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands.

A conventional HDD may implement a disk locked clock (DLC) technique to reduce frequency and phase differences between an internal read channel clock and a servo timing pattern on a surface of the storage disk. This allows data sectors to be written with less frequency variation, such that a clock recovery loop in the read channel does not have to handle as much frequency variation when the data sectors are read.

A typical DLC technique may involve, for example, measuring the position and phase of servo address marks (SAMs) that provide the timing pattern on the surface of the storage disk. Additional details regarding measurement of SAMs in an HDD or other disk-based storage device may be found in U.S. Pat. No. 8,049,982, entitled "Methods and Apparatus for Measuring Servo Address Mark Distance in a Read Channel Using Selective Fine Phase Estimate," which is commonly assigned herewith and incorporated by reference herein.

In many HDD applications it is important to calibrate the phase of an internal read channel clock relative to fixed magnetic information on the disk. For example, in the case of BPM, the phase of the write clock must be properly aligned relative to the bit-sized magnetic islands preformed on the surface of the storage disk in order to be able to write data to these islands. A conventional write calibration procedure generally involves writing one or more test patterns on the disk using different phases or writing such test patterns with a modulated phase across a predetermined phase range, and then going back to read the test patterns to determine which phase was optimal for the desired purpose, such as determining which phase aligns most optimally with the magnetic islands in the case of BPM. As a more particular example, this write calibration procedure may involve writing a periodic test pattern to the media while ramping the write clock phase and then determining at what point during the phase ramp the best result was achieved.

In these and similar write calibration procedures, the write clock phase must be accurately controlled while the test pattern is being written. This functionality is provided by DLC circuitry of the HDD. Since the same internal read channel clock is typically used for both reading and writing, the phase of this clock will be varying during write calibration. However, the DLC circuitry still needs to lock to the SAM timing pattern on the storage disk, and without such a lock the calibration results will not be sufficiently accurate. Thus, the write calibration may be periodically interrupted in order to allow the DLC circuitry to read the timing pattern and compute an error term so as to maintain a phase lock to the timing pattern during the write clock calibration procedure. The amount of time required to perform write calibration is therefore adversely impacted by factors such as the settling time of the DLC circuitry in locking to the timing pattern as the clock phase is varied.

SUMMARY

Illustrative embodiments of the invention provide HDDs or other types of disk-based storage devices that exhibit enhanced operating performance by implementing write calibration in a manner that significantly reduces the settling time of the DLC circuitry as the write clock phase is varied, thereby reducing the amount of time required to perform the write clock calibration.

In one embodiment, an HDD or other disk-based storage device comprises a storage disk, a read/write head configured to read data from and write data to the storage disk, and control circuitry coupled to the read/write head and configured to process data received from and supplied to the read/write head. The control circuitry comprises calibration circuitry configured to vary a phase of a clock signal as a test pattern is written to the storage disk as part of a calibration procedure, and DLC circuitry coupled to the calibration circuitry and configured to obtain phase lock between the clock signal and a timing pattern on a surface of the storage disk. The calibration circuitry is further configured to determine an initial phase update value to be applied by the DLC circuitry in a control loop as the phase of the clock signal is varied as part of the calibration procedure.

By way of example, the initial phase update value may be selected so as to reduce an acquisition time of the control loop relative to an acquisition time that would result if the initial phase update value were instead selected in accordance with a phase variation as specified in the calibration procedure.

As a more particular example, the phase of the clock signal may vary in accordance with a phase ramp as the test pattern is written to the storage disk as part of the calibration procedure. In such an arrangement, the initial phase update value may be determined based at least in part on a phase ramp error measurement generated for a previous iteration of the calibration procedure, such as a single phase ramp error measurement generated for a single immediately preceding iteration of the calibration procedure. Alternatively, the initial phase update value may be determined based at least in part on a plurality of phase ramp error measurements generated for respective previous iterations of the calibration procedure, such as a moving average of a designated number of phase ramp error measurements generated for respective immediately preceding iterations of the calibration procedure. A wide variety of similar embodiments may be configured in which the phase of the clock signal does not vary in accordance with a phase ramp, but instead utilizes a different type of predetermined phase variation.

Additionally or alternatively, the calibration circuitry may be configured to determine a steady state phase update value to be applied by the DLC circuitry in the control loop as the phase of the clock signal is varied as part of the calibration procedure, where the steady state phase update value is different than the initial phase update value.

The calibration circuitry may comprise a plurality of programmable calibration registers configured for storing respective initial and steady state phase update values for use by the DLC circuitry.

One or more of the embodiments of the invention provide significant improvements in disk-based storage devices. For example, by implementing programmable initial update values for phase ramping or other types of phase variations specified by write calibration procedures, the settling time of the DLC circuitry can be significantly reduced, thereby allowing a given iteration of the write calibration procedure to be completed much more quickly and accurately than would otherwise be possible. This leads to improved overall operating performance of the disk-based storage device.

DETAILED DESCRIPTION

Embodiments of the invention will be illustrated herein in conjunction with exemplary disk-based storage devices, control circuitry and associated calibration circuitry and techniques. It should be understood, however, that these and other embodiments of the invention are more generally applicable to any disk-based storage device in which improved performance in terms of accurate and efficient calibration is desired. Additional embodiments may be implemented using components other than those specifically shown and described in conjunction with the illustrative embodiments.

Figure 1:
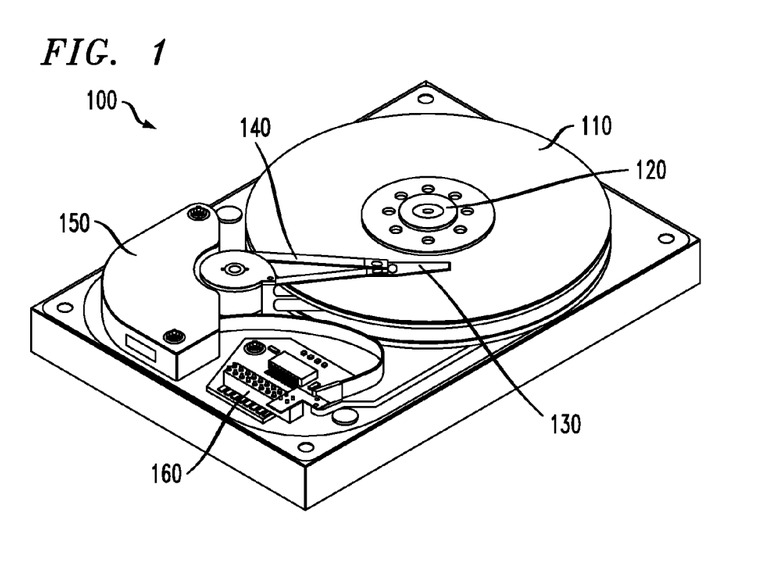
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. A given read/write head as that term is broadly used herein may be implemented in the form of a combination of separate read and write heads.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any storage device application in which it is desirable to provide improved calibration within the storage device. Those skilled in the art will therefore recognize that a wide variety of other storage device configurations may be used in implementing embodiments of the invention.

Figure 2:
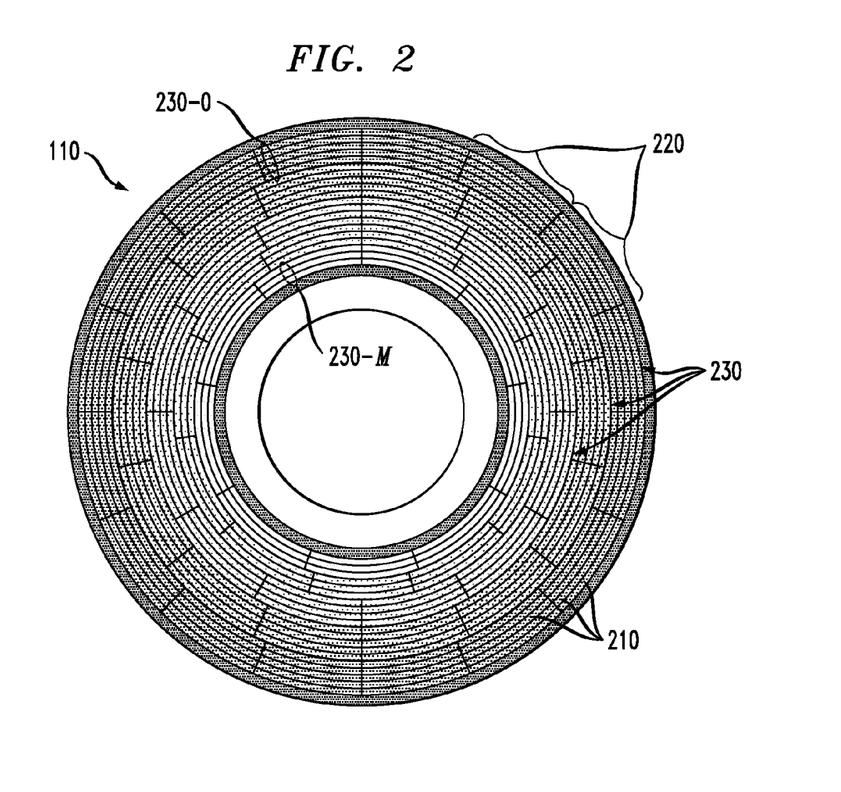
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 is also assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks. Thus, a "timing pattern" as that term is used herein refers to an arrangement of multiple servo marks.

The storage device 100 in the present embodiment implements a disk locked clock (DLC) technique to reduce frequency and phase differences between an internal read channel clock and a servo timing pattern on a surface of the storage disk 110. As indicated previously, a typical DLC technique may involve, for example, measuring the position and phase of servo marks that provide the timing pattern on the surface of the storage disk.

The particular data transfer rates and other features referred to in the embodiment described above are presented for purposes of illustration only, and should not be construed as limiting in any way. A wide variety of other data transfer rates and storage disk configurations may be used in other embodiments.

An embodiment of the invention will be described below in conjunction with FIGS. 3 to 5, in which the storage device 100 of FIG. 1 is configured to implement calibration circuitry that interacts with DLC circuitry in order to provide improved write calibration in the storage device 100. The embodiment may be viewed as an example of an arrangement in which the calibration circuitry is configured to vary a phase of a clock signal as a test pattern is written to the storage disk as part of a calibration procedure. The DLC circuitry is coupled to the calibration circuitry and configured to obtain a phase lock between the clock signal and a timing pattern on a surface of the storage disk. The calibration circuitry is further configured to determine an initial phase update value to be applied by the DLC circuitry in a control loop as the phase of the clock signal is varied as part of the calibration procedure.

The calibration circuitry may additionally or alternatively be configured to determine a steady state phase update value to be applied by the DLC circuitry in the control loop as the phase of the clock signal is varied as part of the calibration procedure, with the steady state phase update value being different than the initial phase update value.

The term "test pattern" as used herein is intended to be broadly construed, so as to encompass, for example, any arrangement of test data that may be written to a disk as part of a calibration procedure. A given such test pattern may therefore comprise a portion of a larger data pattern, a combination of multiple smaller data patterns, a group of repeated data patterns, etc. Numerous calibration test patterns suitable for use in embodiments of the present invention are well known to those skilled in the art.

Figure 3:
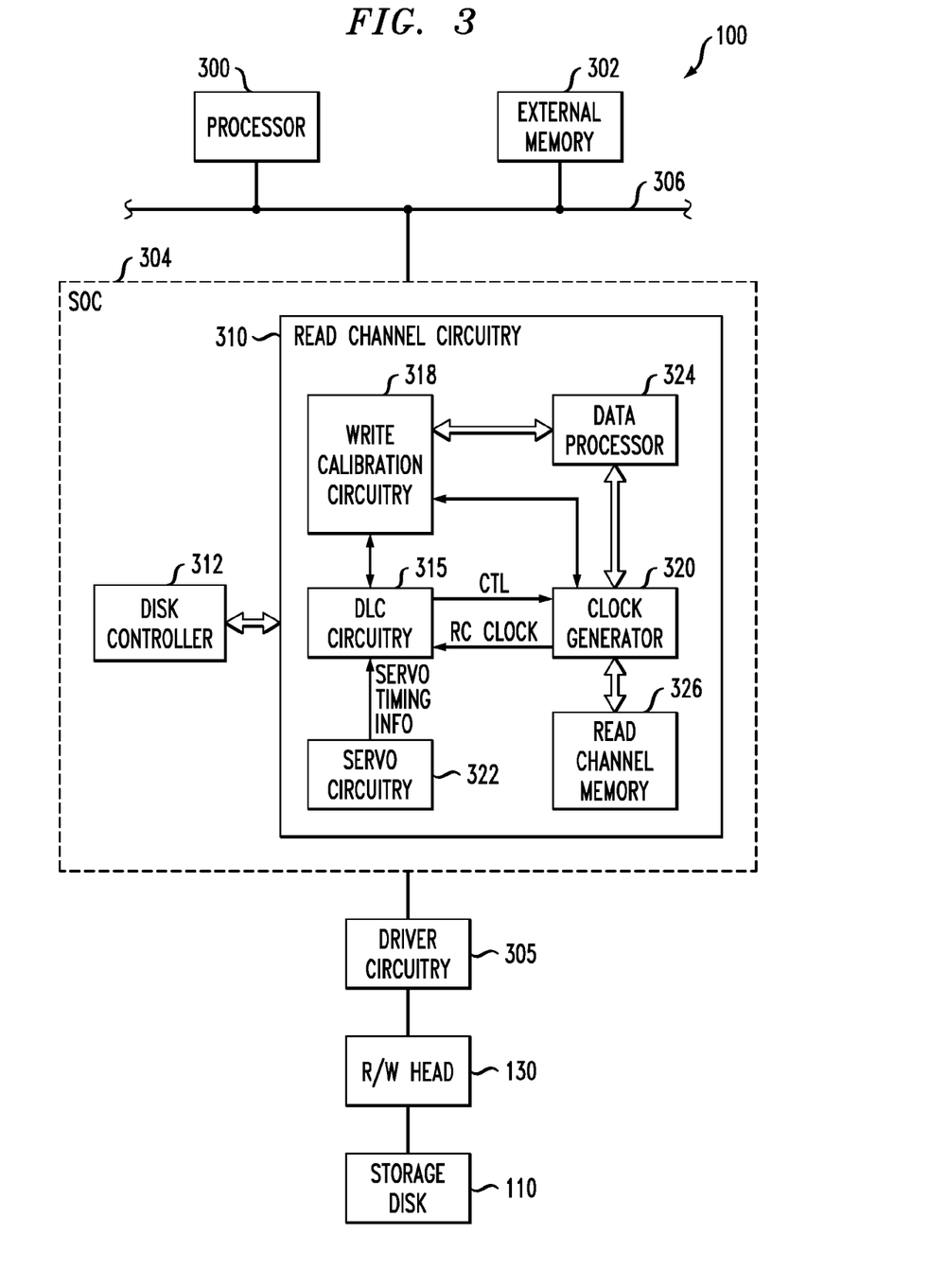
FIG. 3 is a block diagram of a portion of the storage device of FIG. 1 including an exemplary system-on-chip comprising a disk controller and read channel circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises driver circuitry 305 providing an interface between the SOC 304 and the read/write head 130. The driver circuitry 305 may comprise, for example, a preamplifier and other associated interface circuitry. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110. The read channel circuitry 310 comprises DLC circuitry 315, write calibration circuitry 318, a clock generator 320, servo circuitry 322, a data processor 324, and read channel memory 326.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the driver circuitry 305. It should be understood that AXI interconnects are not required, and that a wide variety of other types of bus configurations may be used in embodiments of the invention.

The processor 300, memory 302, SOC 304 and driver circuitry 305 may be viewed as collectively comprising one possible example of "control circuitry" as that term is utilized herein. Numerous alternative arrangements of control circuitry may be used in other embodiments, and such arrangements may include only a subset of the components 300, 302, 304 and 305, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

The write calibration circuitry 318 of SOC 304 may be viewed as an example of what is more generally referred to herein as "calibration circuitry." Write calibration of the type provided by write calibration circuitry 318 as described below can be particularly beneficial in embodiments that implement high-density storage technologies such as shingled magnetic recording (SMR) and bit-patterned media (BPM).

The DLC circuitry 315 as illustrated in FIG. 3 receives servo timing information from the servo circuitry 322, and also receives a read channel clock from the clock generator 320. The clock generator 320 may comprise, for example, an analog synthesizer. The servo circuitry 322 generates the servo timing information by detecting the timing pattern formed by SAMs on the surface of the storage disk 110. The DLC circuitry 315 may include a phase error detector that compares the read channel clock signal from clock generator 320 with the servo timing information from servo circuitry 322. By way of example, this comparison may involve determining if the number of clock cycles of a divided-down version of the read channel clock signal that occur within a time period defined by adjacent detected SAMs is above or below an expected number of such clock cycles.

In such an arrangement, the control signal supplied by the DLC circuitry 315 back to the clock generator 320 may vary in a manner that causes the frequency of the clock signal to increase if the number of clock cycles of the divided-down version of the clock signal that occur within the time period defined by adjacent detected SAMs is below the expected number of such clock cycles. Similarly, the control signal supplied by the DLC circuitry 315 back to the clock generator 320 may vary in a manner that causes the frequency of the clock signal to decrease if the number of clock cycles of the divided-down version of the clock signal that occur within the time period defined by adjacent detected SAMs is above the expected number of such clock cycles. The control signal generated by the DLC circuitry 315 is therefore configured to vary responsive to the comparison of the read channel clock and the servo timing information so as to cause the frequency and phase of the read channel clock to be locked to the servo timing information.

The above-described variations in the control signal are generated in a control loop for which an initial phase update value is determined by the write calibration circuitry 318, as will be described in greater detail below in conjunction with FIGS. 4 and 5. However, the term "control loop" as used herein should not be viewed as being limited to these or similar arrangements, and numerous alternative control loop configurations may be used in other embodiments.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a write calibration procedure carried out by the SOC 304. Thus, at least a portion of the calibration functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, driver circuitry 305 and bus 306. Alternatively, portions of the processor 300, memory 302, driver circuitry 305 and bus 306 may be implemented at least in part in the form of one or more additional integrated circuits, such as otherwise conventional integrated circuits designed for use in an HDD and suitably modified to provide calibration functionality as disclosed herein.

An example of an SOC integrated circuit that may be modified to incorporate an embodiment of the present invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Figure 4:
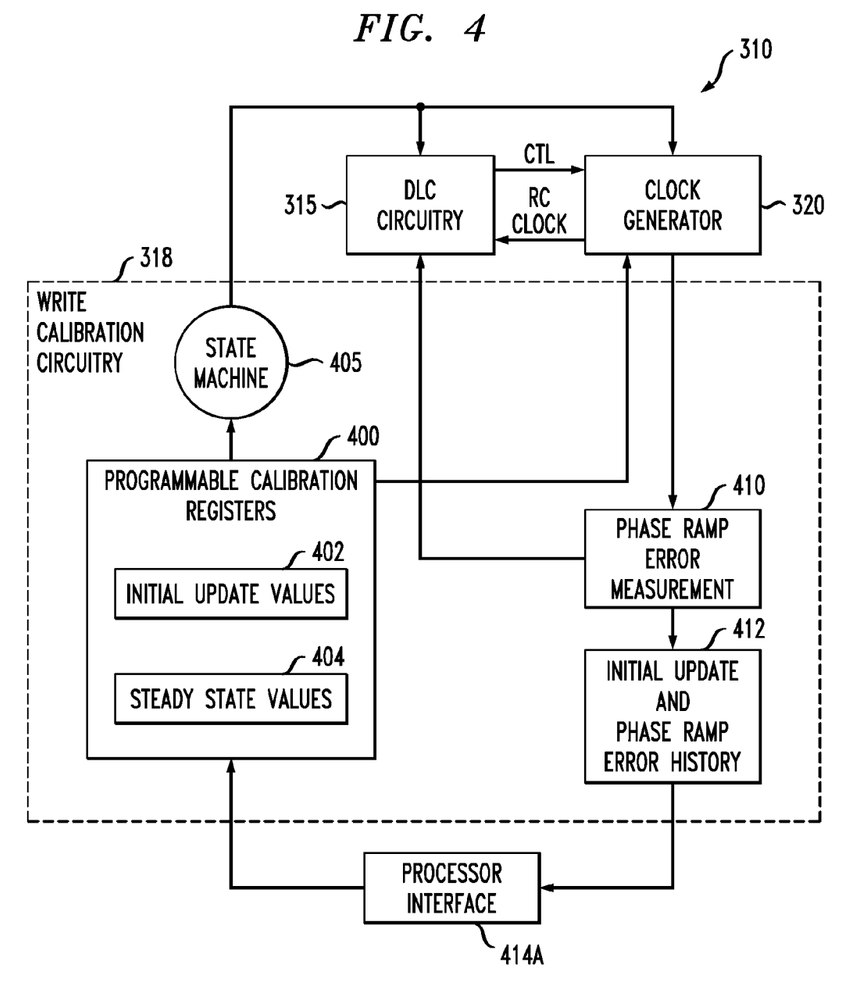
FIG. 4 shows a more detailed view of the read channel circuitry of FIG. 3 including calibration circuitry and associated DLC circuitry in an illustrative embodiment.

FIG. 4 shows portions of the read channel circuitry 310 in greater detail. In this embodiment, calibration circuitry 318 comprises a plurality of programmable calibration registers 400, some of which are configured for storing respective initial phase update values 402 for use by the DLC circuitry 315. The programmable calibration registers 400 in the present embodiment include other registers configured to store respective steady state phase update values 404 for use by the DLC circuitry 315. More particularly, these initial or steady state phase update values are applied by the DLC circuitry in a control loop that controls the frequency and phase of the read channel clock generated by the clock generator 320.

The calibration circuitry 318 is configured to vary a phase of the read channel clock as a test pattern is written to the storage disk 110 as part of a calibration procedure. It is assumed in this embodiment that the read channel clock signal is utilized for both reading data from and writing data to the storage disk 110. Accordingly, the phase of this clock signal varies as the test pattern is written to the storage disk. The DLC circuitry is configured to obtain a phase lock between this clock signal and a timing pattern on a surface of the storage disk 110. As indicated previously, this timing pattern may comprise a plurality of servo marks preformed on the surface of the storage disk. For example, such servo marks may be formed using a servo writer during manufacture of the storage device 100.

The calibration circuitry 318 is also configured to determine an initial phase update value to be applied by the DLC circuitry in the control loop as the phase of the clock signal is varied as part of the calibration procedure. It may also determine a steady state phase update value to be applied by the DLC circuitry in the control loop as the phase of the clock signal is varied as part of the calibration procedure, with the steady state phase update value being different than the initial phase update value.

In the present embodiment, the initial phase update value to be applied by the DLC circuitry 315 is selected from the set of stored initial update values 402 so as to reduce an acquisition time of the control loop relative to an acquisition time that would result if the initial phase update value were instead selected in accordance with a phase variation as specified in the calibration procedure.

By way of example, the calibration procedure may specify that the phase of the clock signal is varied in accordance with a phase ramp as the test pattern is written to the storage disk 110 as part of the calibration procedure. Such a phase ramp can be characterized as a frequency step. If an initial phase update value was determined based only on the phase ramp, the acquisition time of the control loop may be adversely impacted due to the presence of overshoot, ringing or other non-ideal behavior that can occur from the point in time when the phase ramp starts to when it settles onto the desired linear ramp. Such non-ideal behavior often arises before the control loop is able to drive the read channel clock phase to fully settle within a required tolerance, and thereby adversely impacts control loop acquisition time.

The update time of the control loop is typically a longer period of time than the settling time of the analog synthesizer of clock generator 320. In an embodiment in which the servo marks are arranged in radial "wedges" around the storage disk, a control loop update may be performed once per servo wedge where the servo wedge spacing in time is typically on the order of 30 μSec, whereas the settling time of the analog synthesizer of the clock generator 320 is typically closer to 10 μsec. Several updates may be required to lock on to the desired ramping clock trajectory, which could move the overall settling time into the millisecond range for a conventional control loop. A similar issue can arise at the end of the phase ramp when the phase needs to return to a non-phase-varying steady state value after the write calibration procedure is completed.

As a more particular example, assume that the calibration procedure specifies an ideal phase ramp in which the clock phase is changed by 2.5 clock periods each servo wedge interval, where each servo wedge comprises a servo mark. If the requisite frequency step for causing this phase ramp was applied to the analog synthesizer at a given servo wedge, and initially ignoring control loop behavior, the error measurement for the second servo wedge would show a non-ideal phase movement less than the desired 2.5 clock periods. However, the error measurements for the third servo wedge and each servo wedge thereafter would each show a phase movement of 2.5 clock periods.

If we consider now the control loop behavior, at the second servo wedge the DLC circuitry 315 would see that the clock phase had not moved by the desired 2.5 periods and would therefore increase the synthesizer frequency. But at the third servo wedge it would be seen that this caused the clock period to move by more than the desired 2.5 clock periods and the frequency would be decreased thus leading to a ringing effect until the DLC-based read channel clock control settled to the correct value to always move the clock by 2.5 periods each servo wedge interval.

This ringing effect in the control loop can be avoided if for the first servo wedge interval the DLC circuitry 315 is instructed to use a different initial phase update value, as selected by the calibration circuitry 318 from the stored initial update values 402. More particularly, the DLC circuitry 315 is instructed to not expect a full movement of 2.5 clock periods but rather something less than the normal 2.5 clock periods and ideally equal to whatever the actual amount of phase movement was for the first servo interval. This actual amount of phase movement cannot be exactly determined beforehand, but can be estimated in an accurate and efficient manner, for example, using initial phase update values and associated phase error measurements for previous iterations of the calibration procedure. Other techniques can be used to estimate initial phase update values. Such values may vary depending upon analog behavior of the control loop, as well as other factors such as temperature and integrated circuit process variations.

By configuring the calibration circuitry to determine an appropriate initial phase update value that deviates from the value specified by the phase ramp, the acquisition time of the control loop can be substantially reduced, and non-ideal behavior such as the above-noted ringing effect is eliminated. In this example, the initial phase update value is applied only for the first servo wedge interval after initiation of the phase ramp. If the selected initial phase update value closely matches the actual amount of phase movement for the first servo interval, the phase error measurement at the second servo mark would be close to zero, such that no significant adjustment is made in synthesizer frequency at that point, and the control loop would be locked to the servo timing information. For servo wedge intervals after the first servo interval, the standard expected phase movement of 2.5 clock periods would be used in DLC circuitry 315, in accordance with the phase ramp specified by the calibration procedure, and as a result the control loop remains locked despite the presence of the phase ramp.

An appropriate steady state phase update value may be determined and applied by DLC circuitry 315 as the phase is varied in accordance with the phase ramp specified by the calibration procedure, in a manner similar to that described above for the initial phase update value for the beginning of the phase ramp.

Accordingly, the present embodiment addresses issues relating to non-ideal behavior by configuring calibration circuitry 318 to determine an appropriate initial phase update value to be applied by the DLC circuitry 315 at the beginning of the phase ramp, as well as to determine an appropriate steady state value to be applied by the DLC circuitry at the end of the phase ramp. It is to be understood, however, that use of a phase ramp as the write calibration phase variation is only an example, and other embodiments can utilize other functions to vary the clock phase as part of a calibration procedure. Also, although only a single initial update value for the first servo wedge interval is utilized in the present embodiment, other embodiments may determine multiple update values to be applied at the beginning of the phase ramp, for example, for respective ones of at least first and second servo wedge intervals, with similar processing utilized for the steady state phase update values.

The calibration circuitry 318 in the present embodiment determines the appropriate initial phase update value based at least in part on one or more phase error measurements generated for respective previous iterations of the calibration procedure. This determination more particularly involves use of a state machine 405, a phase ramp error measurement module 410, and an initial update and phase ramp error history module 412.

The phase ramp error measurement module 410 takes phase error measurements for respective iterations of the calibration procedure, and provides those measurements to the initial update and phase ramp error history module 412. This module communicates via processor interface 414A with the programmable registers 400, and stores one or more initial update values 402 as determined based on previous initial update values and their corresponding phase ramp error measurements. For example, the module 412 may determine an initial phase update value to be stored in registers 400 as a moving average of a designated number of phase error measurements generated for respective immediately preceding iterations of the calibration procedure. The state machine 405 determines when to provide certain stored initial update or steady state values to the DLC circuitry 315. Such values may also be applied to clock generator 320 as shown.

Multiple phase error measurements may be taken by module 410 for each of a plurality of iterations of the calibration procedure, and processed in module 412 to determine appropriate initial update or steady state values for storage in registers 400. Such values may be stored in the registers under program control.

The processor interface 414A may be one of a plurality of processor interfaces utilized in read channel circuitry 310. As noted above, portions of the calibration circuitry may be implemented using software executed by a processor, and these portions may include at least phase ramp error measurement module 410 and initial update and phase ramp error history module 412. The state machine 405 may also be at least in part implemented in software, and accordingly additional processor interfaces may be implemented between state machine 405 and one or both of DLC circuitry 315 and clock generator 320.

As noted above, the initial phase update estimate can be determined adaptively based on one or more phase error measurements from each of a plurality of previous iterations of the calibration procedure, using a moving average or other function of the corresponding one or more initial phase update values, so as to drive the residual first update error towards zero.

In some embodiments, the analog synthesizer settling time could span more than one servo wedge interval, in which case more than one unique phase update value could be utilized. Alternatively, the servo updates could simply be blocked until after the maximum settling time and then a single unique initial phase update value could be applied at the first servo update after the synthesizer is known to have settled.

Figure 5:
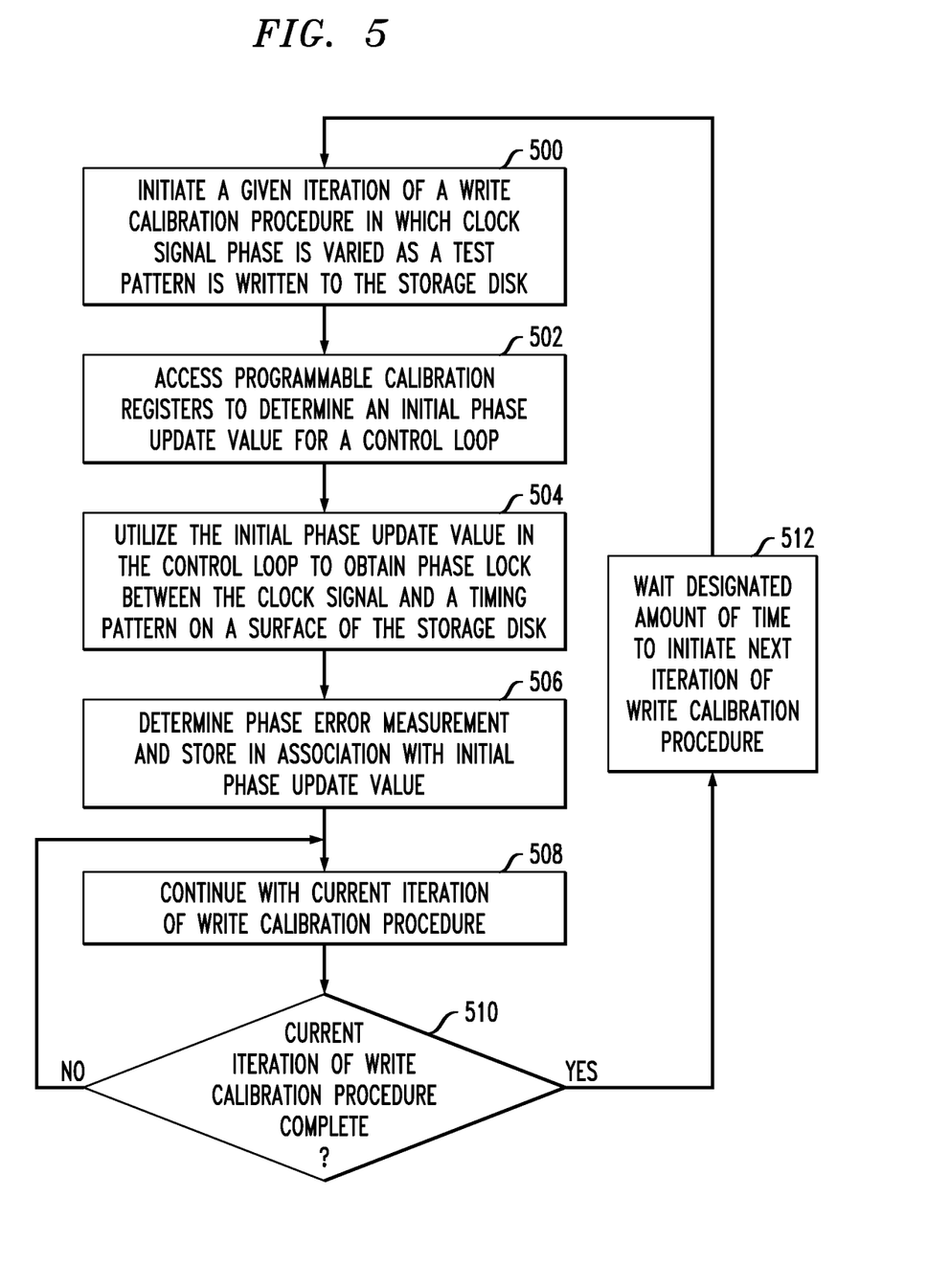
FIG. 5 is a flow diagram illustrating the operation of the circuitry shown in FIG. 4.

FIG. 5 shows an exemplary process implemented using the FIG. 4 circuitry. The process as shown includes steps 500 through 512.

In step 500, a given iteration of a write calibration procedure is initiated, where the write calibration procedure involves varying clock signal phase as a test pattern is written to the storage disk 110. As noted above, the variation may be in accordance with a phase ramp, or another function. Illustratively, the clock signal is an internal read channel clock signal that is used for both reading and writing in the storage device 100.

In step 502, one or more of the programmable calibration registers 400 are accessed to determine an initial phase update value for a control loop that controls the frequency and phase of the clock signal.

In step 504, the selected initial phase update value is utilized in the control loop to obtain phase lock between the clock signal and a timing pattern of servo marks on the surface of the storage disk 110.

In step 506, a phase error measurement is determined and stored in association with the initial phase update value.

In step 508, the current iteration of the write calibration procedure continues, utilizing, for example, the above-noted phase ramp to vary the clock phase as the test pattern is written to the storage disk 110.

In step 510, a determination is made as to whether or not the current iteration of the write calibration procedure is complete. If the current iteration is not complete, the process returns to step 508 as indicated. Otherwise, the process moves to step 512.

In step 512, the process waits a designated amount of time to initiate the next iteration of the write calibration procedure, and after the designated amount of time returns back to step 500 such that the next iteration is initiated.

Similar process steps may be utilized in determining an appropriate steady state phase update value to be utilized in conjunction with the current iteration of the write calibration procedure.

It is to be appreciated that the particular circuitry arrangements and processing operations shown in FIGS. 3, 4 and 5 are presented by way of example only, and other embodiments of the invention may utilize other types and arrangements of elements for implementing calibration functionality as disclosed herein.

For example, with reference to the flow diagram of FIG. 5, process steps illustrated as being performed serially can instead be performed at least in part in parallel with one another. Also, the relative ordering of at least a subset of the process steps may be altered in other embodiments.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, as noted above, recording techniques such as SMR and BPM can be used in one or more embodiments of the invention. In one possible BPM embodiment of the invention, the write clock phase may need to be calibrated as often as once every few seconds. Therefore, as in one or more other embodiments herein, this BPM embodiment may be configured to set a unique initial phase update value for the first servo wedge interval based on, for example, a single previous initial phase update value and its associated phase measurement error for a previous iteration of the calibration procedure, or a moving average of a designated number of previous initial phase update values and their associated phase measurement errors for respective previous iterations of the calibration procedure. As described previously, this can reduce control loop acquisition time and significantly improve overall performance of the storage device.

Figure 6:
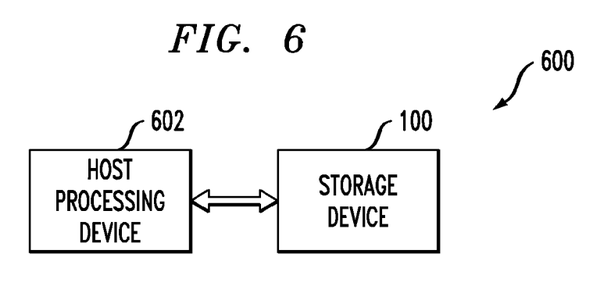
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
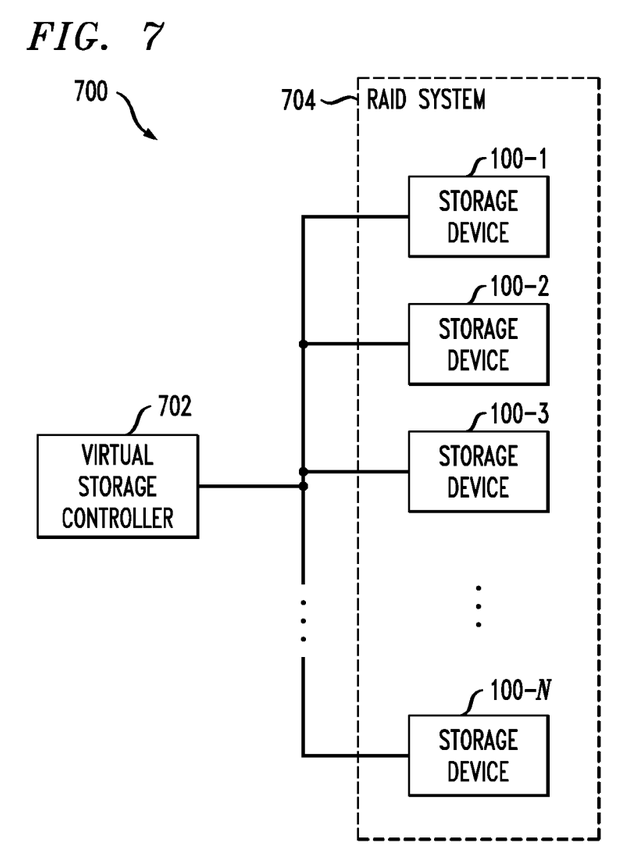
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, ... 100-N, one or more of which are assumed to be configured to include calibration functionality as disclosed herein. These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of storage disks, read/write heads, control circuitry and other storage device elements for implementing the described calibration functionality. Also, the particular manner in which a write calibration procedure or other type of calibration procedure is implemented using calibration circuitry of a storage device may be varied in other embodiments. These and numerous other alternative embodiments within the scope of the following claims will be apparent to those skilled in the art.

What is claimed is:

1. An apparatus comprising:
control circuitry adapted for coupling to a read/write head configured to read data from and write data to a storage disk, the control circuitry being configured to process data received from and supplied to the read/write head;
the control circuitry comprising:
calibration circuitry configured to vary a phase of a clock signal as a test pattern is written to the storage disk as part of a calibration procedure; and
disk locked clock circuitry coupled to the calibration circuitry and configured to obtain a phase lock between the clock signal and a timing pattern on a surface of the storage disk;
wherein the calibration circuitry is further configured to determine an initial phase update value to be applied by the disk locked clock circuitry in a control loop as the phase of the clock signal is varied as part of the calibration procedure.

2. The apparatus of claim 1 wherein the initial phase update value is selected so as to reduce an acquisition time of the control loop relative to an acquisition time that would result if the initial phase update value were instead selected in accordance with a phase variation as specified in the calibration procedure.

3. The apparatus of claim 1 wherein the calibration circuitry comprises a plurality of programmable calibration registers configured for storing respective initial phase update values for use by the disk locked clock circuitry.

4. The apparatus of claim 1 wherein the calibration circuitry is further configured to determine a steady state phase update value to be applied by the disk locked clock circuitry in the control loop as the phase of the clock signal is varied as part of the calibration procedure, the steady state phase update value being different than the initial phase update value.

5. The apparatus of claim 4 wherein the calibration circuitry comprises a plurality of programmable calibration registers configured for storing respective steady state phase update values for use by the disk locked clock circuitry.

6. The apparatus of claim 1 wherein the phase of the clock signal varies in accordance with a phase ramp as the test pattern is written to the storage disk as part of the calibration procedure.

7. The apparatus of claim 1 wherein the initial phase update value is determined based at least in part on a plurality of phase error measurements generated for respective previous iterations of the calibration procedure.

8. The apparatus of claim 7 wherein the initial phase update value is determined as a moving average of a designated number of phase error measurements generated for respective immediately preceding iterations of the calibration procedure.

9. The apparatus of claim 1 wherein the timing pattern comprises a plurality of servo marks preformed on the surface of the storage disk.

10. The apparatus of claim 1 wherein the control circuitry is fabricated in at least one integrated circuit.

11. The apparatus of claim 1 wherein the clock signal comprises an internal read channel clock signal utilized for both reading data from and writing data to the storage disk.

12. The apparatus of claim 11 wherein the control circuitry further comprises:
a disk controller; and
read channel circuitry comprising a read channel memory;
wherein the disk locked clock circuitry is implemented at least in part within the read channel circuitry and is operative to lock the read channel clock signal to the timing pattern on the surface of the storage disk.

13. The apparatus of claim 12 wherein the control circuitry comprises a system-on-chip integrated circuit that implements at least a portion of both the disk controller and the read channel circuitry.

14. The apparatus of claim 1 comprising a processor and a memory coupled to the processor, wherein at least a portion of at least one of the calibration circuitry, the disk locked clock circuitry and the control loop is implemented by the processor executing software code stored in the memory.

15. A storage device comprising the apparatus of claim 1.

16. A virtual storage system comprising the storage device of claim 15.

17. A method comprising the steps of:
initiating a calibration procedure in which a phase of a clock signal is varied as a test pattern is written to a storage disk;
determining an initial phase update value for a control loop; and
utilizing the initial phase update value in the control loop to obtain a phase lock between the clock signal and a timing pattern on a surface of the storage disk.

18. The method of claim 17 wherein determining the initial phase update value for the control loop comprises determining the initial phase update value based at least in part on a plurality of error measurements generated for respective previous iterations of the calibration procedure.

19. The method of claim 17 wherein determining the initial phase update value for the control loop comprises determining the initial phase update value based as a moving average of a designated number of phase error measurements generated for respective immediately preceding iterations of the calibration procedure.

20. A non-transitory computer-readable storage medium having embodied therein executable code for performing the steps of the method of claim 17.

21. A processing system comprising:
a processing device; and
a storage device coupled to the processing device and comprising at least one storage disk;
wherein the storage device further comprises:
a read/write head configured to read data from and write data to the storage disk; and
control circuitry coupled to the read/write head and configured to process data received from and supplied to the read/write head;
the control circuitry comprising:
calibration circuitry configured to vary a phase of a clock signal as a test pattern is written to the storage disk as part of a calibration procedure; and
disk locked clock circuitry coupled to the calibration circuitry and configured to obtain a phase lock between the clock signal and a timing pattern on a surface of the storage disk;
wherein the calibration circuitry is further configured to determine an initial phase update value to be applied by the disk locked clock circuitry in a control loop as the phase of the clock signal is varied as part of the calibration procedure.

* * * * *